United States Patent
Eble et al.

(10) Patent No.: US 12,002,132 B1
(45) Date of Patent: Jun. 4, 2024

(54) RENDERING USING ANALYTIC SIGNED DISTANCE FIELDS

(71) Applicant: Apple Inc., Cupertino, CA (US)

(72) Inventors: Tobias Eble, Sunnyvale, CA (US); William J. Dobbie, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 17/687,015

(22) Filed: Mar. 4, 2022

Related U.S. Application Data

(60) Provisional application No. 63/158,420, filed on Mar. 9, 2021.

(51) Int. Cl.
*G06T 1/20* (2006.01)
*G06T 11/20* (2006.01)
*G06T 15/00* (2011.01)

(52) U.S. Cl.
CPC .............. *G06T 11/203* (2013.01); *G06T 1/20* (2013.01); *G06T 15/005* (2013.01)

(58) Field of Classification Search
CPC . G06T 1/20; G06T 1/60; G06T 11/203; G06T 15/005
USPC ........................................................ 345/501
See application file for complete search history.

(56) References Cited

U.S. PATENT DOCUMENTS

| | | | |
|---|---|---|---|
| 7,095,411 | B2 | 8/2006 | Salesin et al. |
| 7,239,319 | B2 | 7/2007 | Loop |
| 7,639,258 | B1 | 12/2009 | Dowling et al. |
| 8,730,253 | B2 | 5/2014 | Kilgard |
| 9,483,862 | B2 | 11/2016 | Goel et al. |
| 2017/0039739 | A1* | 2/2017 | Doran ................ G06T 11/40 |

* cited by examiner

*Primary Examiner* — Jacinta M Crawford
(74) *Attorney, Agent, or Firm* — Thompson Hine LLP

(57) ABSTRACT

Various implementations disclosed herein include devices, systems, and methods that use an analytic approach to determine signed distance field (SDF) representations that represent one or more curves (e.g., glyphs that represent text) and cache the SDF representations for reuse in rendering the curves in similar rendering conditions. For example, the SDF representation may be re-used, based on determining that text is going to occupy a similar-sized portion of the device's display in multiple views. An SDF representation is recalculated if different conditions (e.g., substantial zooming in on the text) occur in different views.

24 Claims, 4 Drawing Sheets

RENDERING USING ANALYTIC SIGNED DISTANCE FIELDS

CROSS-REFERENCE TO RELATED APPLICATIONS

This application claims the benefit of U.S. Provisional Application Ser. No. 63/158,420 filed Mar. 9, 2021, which is incorporated herein in its entirety.

TECHNICAL FIELD

This disclosure generally relates to electronic devices that provide views of content, and in particular, to systems, methods, and devices for providing views of electronic content that include text.

BACKGROUND

Some techniques for rendering text use an electronic device's central processing unit (CPU) to produce an image that can be consumed by the device's graphics processing unit (GPU). Individual glyphs (e.g., letters, characters, symbols, etc.) are stored as vector representations, e.g., paths of cubic or quadratic Bezier curves, that are rasterized on the CPU to produce images that are stored together in an atlas. The GPU is then used to render text by using the atlas to draw each glyph. Some other techniques store glyphs using signed distance fields (SDFs) based on image-Euclidean distance determinations made by the CPU. Both of these atlas-based and SDF-based techniques are based on taking the original glyph representations and using a CPU to render an image that can be consumed by a GPU to render text. There are various disadvantages to using these and other existing rendering techniques.

SUMMARY

Various implementations disclosed herein include devices, systems, and methods that use an analytic (rather than an image-Euclidean distance-based) approach to determine SDF representations that represent glyphs and cache the SDF representations for reuse in similar rendering conditions. For example, the SDF representation may be re-used, based on determining that the text is going to occupy a similar-sized portion of the device's display. An SDF representation is recalculated if different conditions (e.g., substantial zooming in on the text) occur. Using an analytic (as opposed to an image-Euclidean distance-based) approach to determine the SDF representations may enable relatively fast and efficient calculation of SDF representations on an electronic device's GPU rather than the CPU. This may improve the ability of the device to perform the required computations quickly, for example, enabling real time and high-frame rate applications even on devices with relatively modest GPU capabilities. Moreover, reusing cached SDF representations for multiple similar frames further reduces the processing requirements, further enabling real time and high-frame rate applications even on devices with relatively modest processing capabilities.

One exemplary method is performed by an electronic device executing instructions to perform operations. The operations include generating an SDF representation representing distances of multiple positions (e.g., pixels of an SDF image) to closest edges of a curve (e.g., a glyph defined by Bezier curves, lines, circle segments, etc.) that can be defined by a mathematical function or relationship. The SDF representation is generated by solving a function (e.g., a cubic polynomial) based on a mathematical function or relationship that defines the curve. The SDF representation may be stored as a 2D texture (e.g., an atlas of all letters for a particular font and size). The SDF representation may be generated via a GPU, e.g., using a GPU shader. In some implementations, the SDF representation is stored in a cache and reused to re-render the curve in similar conditions.

The operations of the exemplary method further include rendering a first image (e.g., a first frame) depicting the curve in a first rendering condition, where the first image is rendered using the SDF representation. The operations may further include determining to reuse the SDF representation for rendering a second image (e.g., a second frame) depicting the curve in a second rendering condition based on a similarity of the second rendering condition to the first rendering condition and rendering the second image (e.g., the second frame) depicting the curve in the second rendering condition, where the second image is rendered using the SDF representation.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory, computer-readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
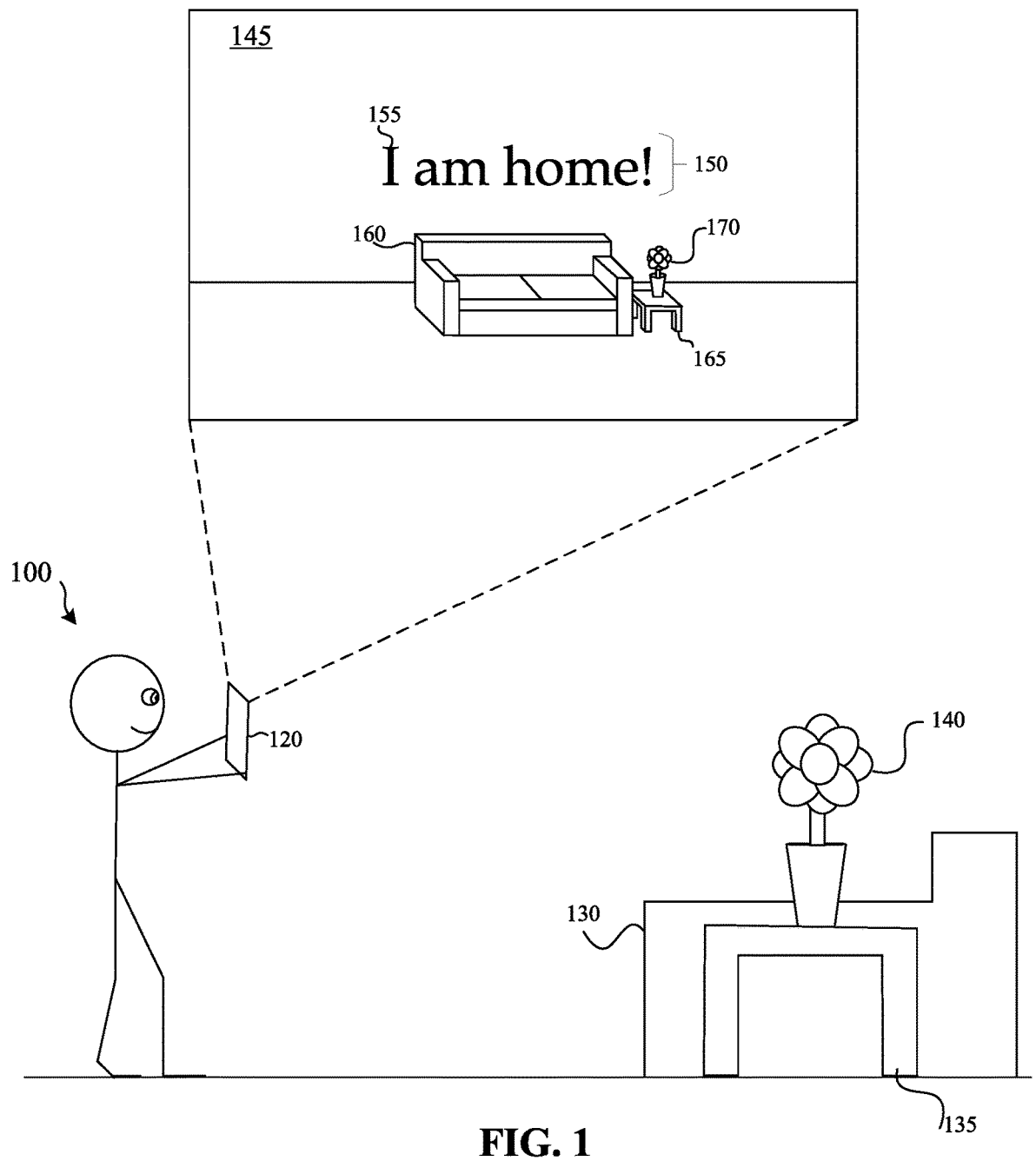
FIG. 1 illustrates an example of an electronic device being used in a physical environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an example physical environment 100 (e.g., a room) including a device 120. A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell. In this example, the physical environment includes a sofa 130, an end table 135, and a flower in a vase 140.

In some implementations, the device 120 displays content 145 to a user. For example, content 145 may include a user interface icon, a text box, a graphic, an avatar of the user or another user, and/or views of an environment such as an extended reality (XR) environment that is based at least in part on the physical environment 100. In this example, the content 145 includes a view of an XR environment that includes the physical environment 100 (e.g., a depiction 160 of the couch 130, a depiction 165 of the end table 135, and a depiction 170 of the flower in a vase 140) and added text 155, including a rendering 155a of a glyph (e.g., glyph 255 of FIG. 2).

To provide content 145, the device 120 obtains image data, motion data, and/or other data corresponding to the physical environment 100 via a plurality of sensors. For example, one or more image sensors on the device 120 may obtain images of the physical environment 100. In another example, one or more depth sensors on the device 120 obtain depth data, such as depth images, of the physical environment 100. The device positions the text 150 at a fixed position relative to the physical environment. In other words, as the user moves around the physical environment and views content representing the XR environment from different positions, the text 150 retains its relative position to the physical environment 145, e.g., the text 150 maintains its position above depictions of the sofa 130.

In some implementations, as illustrated in FIG. 1, the device 120 is a handheld electronic device (e.g., a smartphone or a tablet). In some implementations the device 120 is a laptop computer or a desktop computer. In some implementations, the device 120 has a touchpad and, in some implementations, the device 120 has a touch-sensitive display (also known as a "touch screen" or "touch screen display"). In some implementations, the device 120 is a wearable device such as a head mounted device (HMD). While this example and other examples discussed herein illustrate a single device 120 in the physical environment 100, the techniques disclosed herein are applicable to multiple devices as well as to other environments. For example, the functions of device 120 may be performed by multiple devices, using the displays, sensors, or other components on each respective device, or divided among them in any combination.

Figure 2:
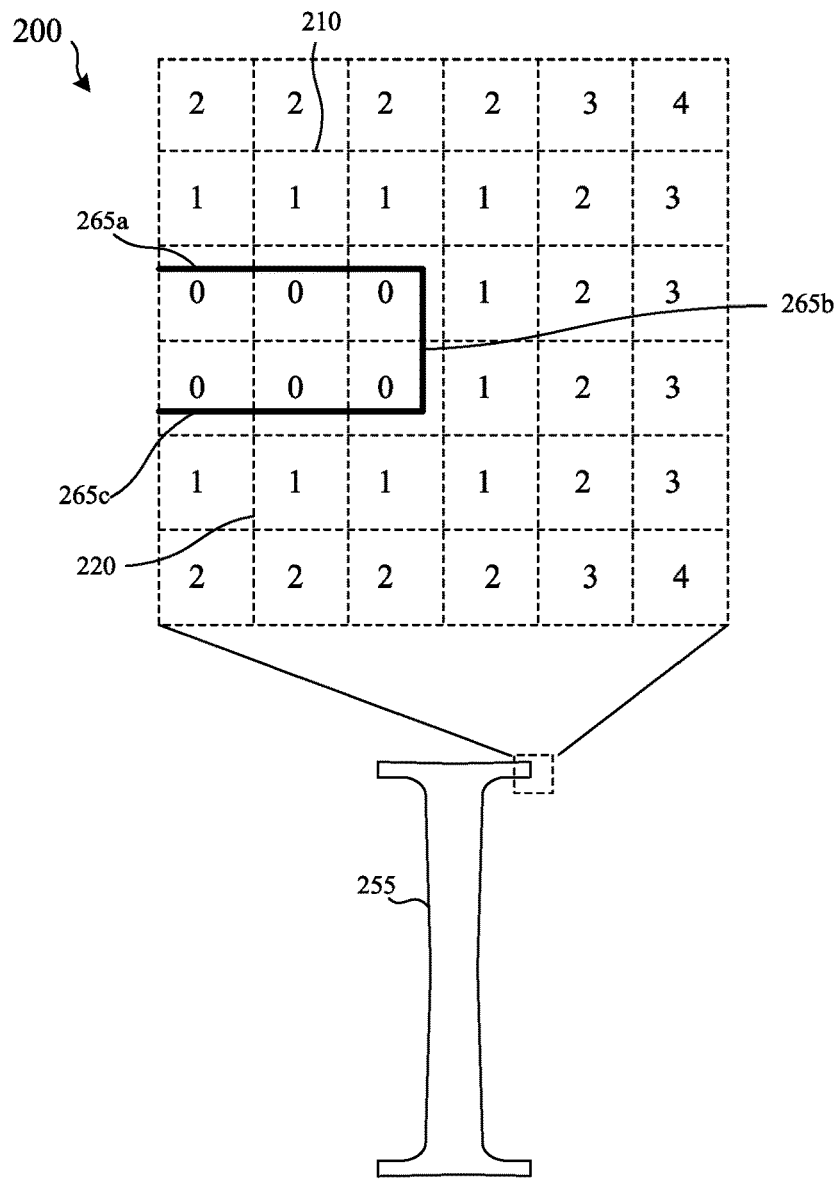
FIG. 2 illustrates a portion of an SDF representation generated for a portion of a glyph.

FIG. 2 illustrates a portion 200 of an SDF representation generated for a glyph 255. The glyph may be defined by one or more curves that may be represented by one or more mathematical functions or relationships. For example, a portion of the glyph 255 includes a first curve 265a, a second curve 265b, and a third curve 265c. These curves 265a-c are depicted over the portion 200 of the SDF representation for illustrative purposes but are not themselves part of the SDF representation. Rather the SDF representation (including portion 200) includes pixel values that represent distances to a nearest respective portion of the glyph 255. For example, pixel 210 of the portion 200 of the SDF representation has value "1" because this pixel has a distance of 1 away from a nearest portion of the glyph, i.e., from curve 265a. Similarly, pixel 220 of the portion 200 of the SDF representation also has value "1" based on the pixel 220 having a distance of 1 away from a nearest portion of the glyph, i.e., from curve 265c.

Certain implementations disclosed herein determine SDF representation distance values using an analytic (i.e., function-based) technique rather than by performing a Euclidean distance transform-based calculation. A Euclidean distance transform-based calculation may require evaluating each pixel, e.g., comparing each pixel with all of its neighboring pixels. However, because the glyph 255 is composed of only elements (e.g., curves, lines, and circles) that can be defined by a mathematical function or relationship, the SDF representation distance values can be determined analytically, e.g., by solving a function to determine the distance value for a particular position/pixel.

Since solving a function, e.g., a cubic polynomial, may be performed efficiently (e.g., using parallel processing) on a GPU, a GPU may be used to generate the SDF representation. Some implementations generate an SDF representation of a glyph without needing to render an image and performing an image transform. Instead, the SDF representation may be performed analytically (e.g., using a mathematical function) using the mathematical functions/representations of the glyph curves and thus without performing a rendering and image transform.

Using an analytic (as opposed to an image-Euclidean distance-based) approach to determine the SDF representations may enable relatively fast and efficient calculation of SDF representations on an electronic device's GPU rather than the CPU. This may improve the ability of the device to perform the required computations quickly, for example, enabling real time and high-frame rate applications even on devices with relatively modest GPU capabilities.

Figure 3:
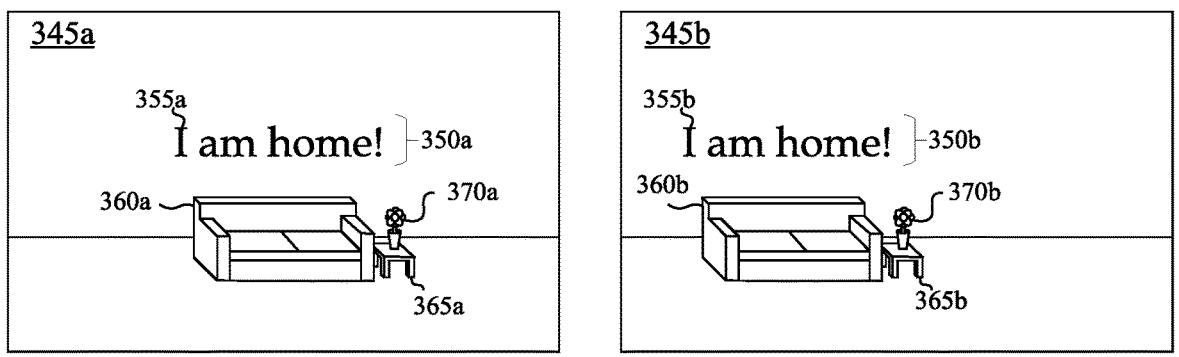
FIG. 3 illustrates use of a single, stored SDF representation to render text in similar conditions.

FIG. 3 illustrates use of a single, stored SDF representation to render text in similar conditions. In this example, the content 345a includes a first view of an XR environment that includes the physical environment 100 (e.g., a depiction 360a of the couch 130, a depiction 365a of the end table 135, and a depiction 370a of the flower in a vase 140) and added text 355a (including a rendering 355a of a glyph (e.g., glyph 255 of FIG. 2) based on a first SDF representation, e.g., an SDF representation corresponding to portion 200. The content 345b includes a second view of the XR environment that similarly includes the physical environment 100 (e.g., a depiction 360b of the couch 130, a depiction 365b of the end table 135, and a depiction 370b of the flower in a vase 140) and added text 355b from a different viewing position. Since the conditions for rendering the text (i.e., added text 355a and added text 355b) are similar, the same SDF representation is used to render these text items. For example, the SDF representation corresponding to the portion 200 of FIG. 2 may be used to render both added text 355a and 355b. In some implementations the SDF representation is generated via the device's GPU and stored in a cache or other memory accessible by the GPU. The content 345a, 345b may be provided as part of a sequence of views or frames that are presented during a user experience. Accordingly, a single SDF representation may be used to present text in multiple frames (e.g., consecutive or not consecutive) presented during such an experience.

The determination of whether to reuse an SDF representation of a glyph or other curve may be based on an assessment of condition similarity. In some implementations, this involves estimating a size (e.g., height, width, area, etc.) that a rendering of curve or other glyph will occupy on a display. For example, a first SDF representation may be generated for a condition in which a glyph will be rendered in an area of X pixels. The system may determine to reuse the SDF representation on a second condition based on determining that, in the second condition, the glyph will be rendered in an area of Y pixels that is within a threshold size (e.g., difference, percentage, etc.) of X. In other implementations, whether to reuse an SDF representation may be determined based on whether the position of the real or virtual object and/or the user/viewer has changed less than a threshold distance or percentage. Similarly, where text is positioned based on a real or virtual object, whether to reuse an SDF representation may be determined based on determining that the position of the real or virtual object and/or the user/viewer have changed less than a threshold distance or percentage. Other techniques may be used to estimate whether the reuse an SDF representation, for example, based on comparing one or more attributes (e.g., zoom status) of the first and second conditions in which the glyph will be used. In still other implementations, resource (e.g., processing, storage, power, etc.) are additional or alternative factors used to determine whether to re-use an SDF representation or generate a new SDF representation.

Figure 4:
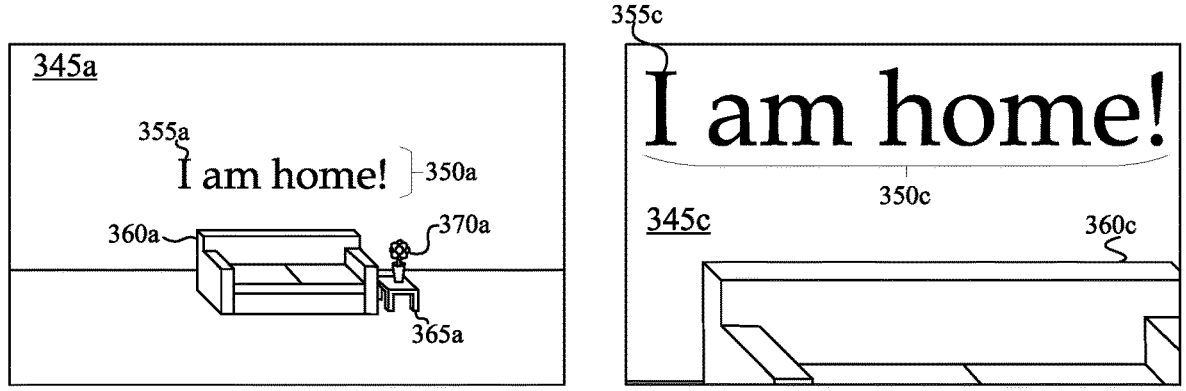
FIG. 4 illustrates use of different SDF representations to render text in different conditions.

FIG. 4 illustrates use of different SDF representations to render text in different conditions. In this example, view 345a is the same as depicted and described with respect to FIG. 3. However, the content 345c includes a second view of the XR environment that includes the physical environment 100 (e.g., a depiction 360c of the couch 130) and added text 355c in a much closer (or zoomed in) viewing condition. Since the conditions for rendering the text (i.e., added text 355a and added text 355c) are different, different SDF representation are used to render these text items. For example, the SDF representation corresponding to the portion 200 of FIG. 2 may be used to render added text 355a while a different SDF representation (e.g., corresponding the portion 500 of FIG. 5) may be used to render the text item 355b. In some implementations, both of the SDF representations are generated via the device's GPU. The content 345a, 345c may be provided as part of a sequence of views or frames that are presented during a user experience. Accordingly, different SDF representations may be used to present text in multiple frames (e.g., consecutive or not consecutive) presented during such an experience.

Figure 5:
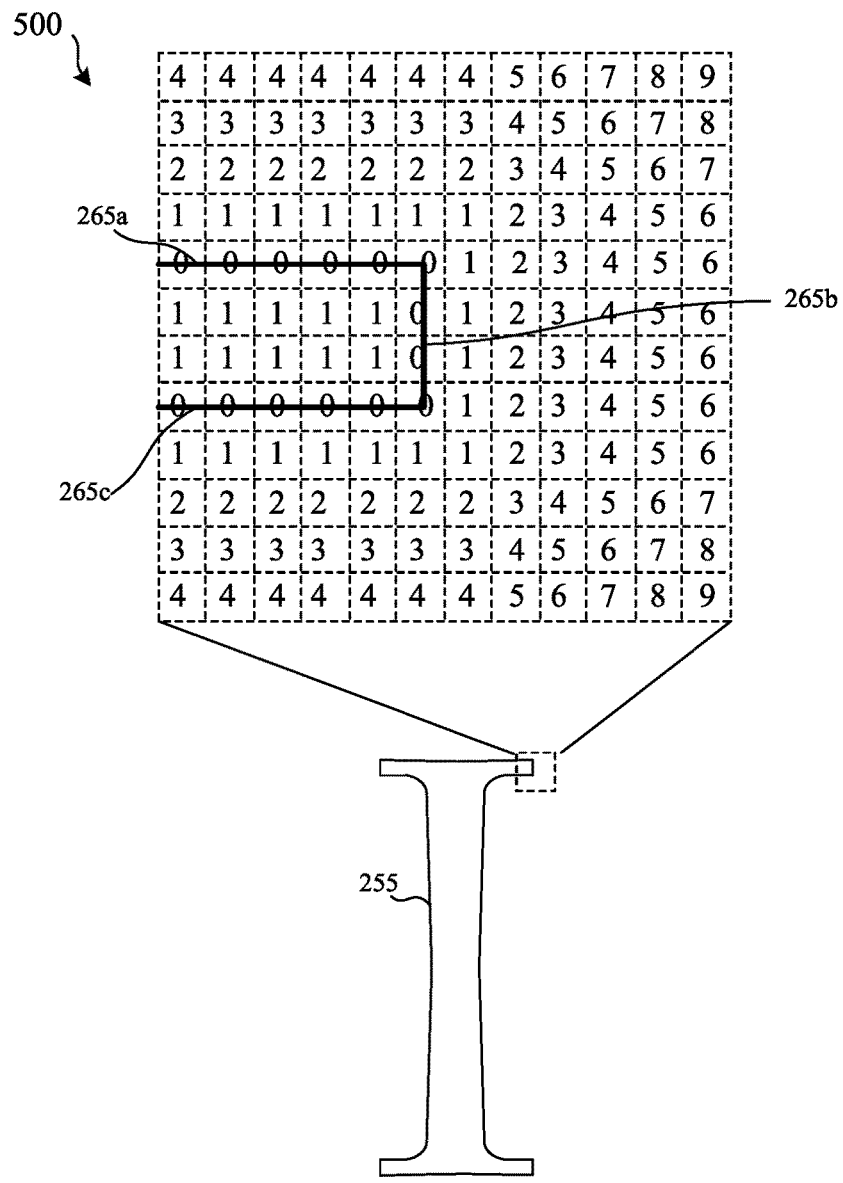
FIG. 5 illustrates a portion of a different SDF representation generated for a portion of the glyph of FIG. 2.

FIG. 5 illustrates a portion 500 of a different SDF representation generated for a portion of the glyph 255 of FIG. 2. The portion of the glyph 255 includes a first curve 265a, a second curve 265b, and a third curve 265c which are depicted over the portion 500 of the SDF representation for illustrative purposes but are not themselves part of the SDF representation. Rather the SDF representation includes pixel values that represent distances to a nearest respective portion of the glyph 255. Similar to the SDF representation discussed with respect to FIG. 2, the SDF representation corresponding to the portion 500 may be determined using an analytic (i.e., function-based) technique rather than by performing a Euclidean di stance transform-based calculation.

Comparing the portion 500 of the SDF representation of FIG. 5 with the portion 200 of the SDF representation of FIG. 2 illustrates a relatively denser pixel density in the portion 500 than in the portion 200. Such a relatively denser pixel density may be used based on the different rendering conditions. For example, such a relatively denser pixel density in the SDF representation may be appropriate for rendering the text in a close (or zoomed in) condition such as is illustrated in content 345c of FIG. 4.

In various implementations, SDF representations are cached and re-used for use when rendering conditions are similar to those for which the SDF representation was originally generated and new SDF representations are generated when rendering conditions are different than those associated with the one or more stored SDF representations. In some implementations, SDF representations are cached or otherwise stored and available for reuse until the cache/storage is needed for another purpose, e.g., for storing a more-recently generated SDF representation. In some implementations, SDF representations are generated and cached or otherwise stored for sets of glyphs, e.g., all the glyphs associated with a particular font (and set of similar rending conditions) may be generated and stored in a single SDF-based atlas. A different atlas may generated and stored for the font and a different set of similar rendering conditions.

Figure 6:
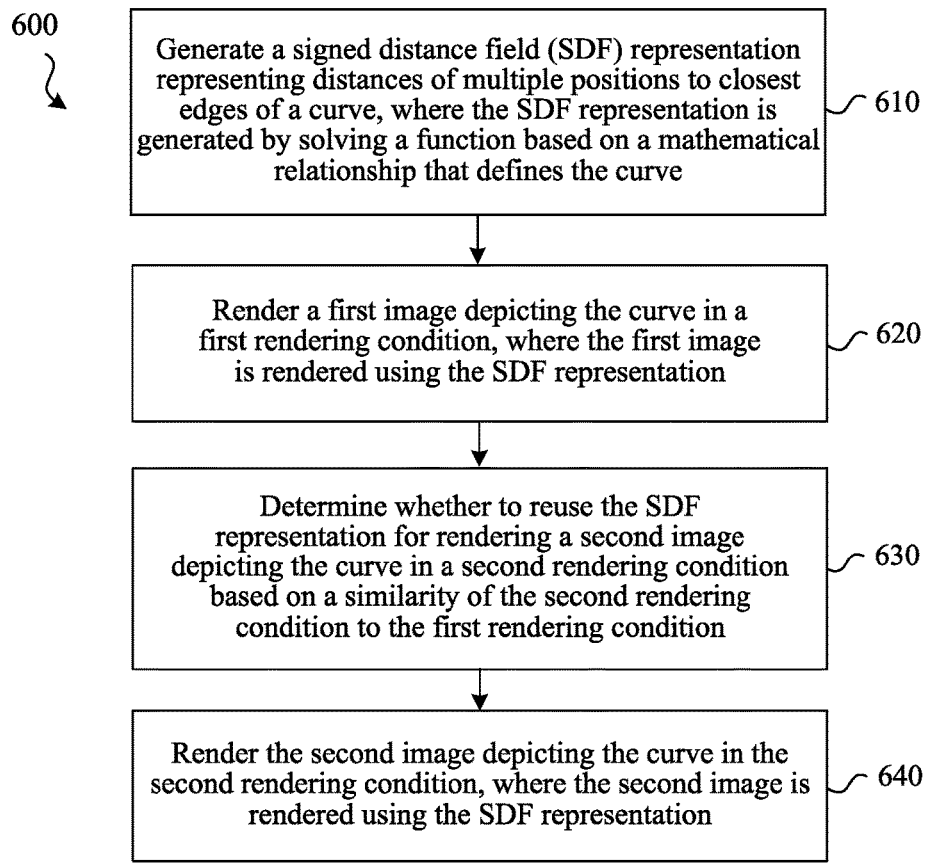
FIG. 6 is a flowchart representation of a method of rendering a curve in accordance with some implementations.

FIG. 6 is a flowchart representation of a method 600 of rendering a curve, e.g., a curve forming some or all of one or more glyphs. In some implementations, the method 600 is performed by a device 120, such as a mobile device, desktop, laptop, HMD, or server device. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 610, the method 600 generates an SDF representation representing distances of multiple positions (e.g., pixels) to closest edges of a curve, e.g., at least a portion of a letter defined by Bezier curves, lines, circle segments, etc., that can be defined by one or more mathematical functions or relationships. The SDF representation is generated analytically, e.g., by solving a function based on a mathematical function/relationship that defines the curve. The SDF representation may be generated without rasterizing the curve and/or applying a Euclidian transformation. In some implementations, the SDF representation is generated by solving a cubic polynomial that is determined based on one or more relationships/functions representing the curve. FIGS. 2 and 5 represent portions 200, 500 of SDF representations of curves (e.g., glyphs) that may be generated via an analytic approach.

The SDF representation may be stored as a 2D texture (e.g., an atlas of all letters) of a particular font. In some implementations, the SDF representation is stored in a memory such as a cache for use in rendering the curve one or more times in similar rendering conditions. The SDF representation may be generated via a GPU and stored in a GPU cache. The SDF representation may be generated using a GPU shader.

In some implementations, an optimization is performed to determine the SDF representation. This may involve chopping the curve into a grid in which each cell stores a reference to nearby curve portions (e.g., Bezier curves, lines, circles, etc.) so that each pixel can be compared with a subset of less than all of the potential curves to identify the distance to the closest part of the curve.

At block 620, the method 600 involves rendering a first image (e.g., a first frame) depicting the curve in a first rendering condition, where the first image is rendered using the SDF representation. The curve may be rendered based on the values of the SDF representation of the curve. For example, in rendering the curve, pixels of the SDF representation having 0 distance values may be rendered as black, pixels having distance values of 1 or less may be rendered as a shade of grey (e.g., depending upon the distance value), and other pixels that have greater distance values may be rendered as transparent.

At block 630, the method 600 involves determining to reuse the SDF representation for rendering a second image (e.g., a second frame) depicting the curve in a second rendering condition based on a similarity of the second rendering condition to the first rendering condition. For example, as illustrated in FIG. 3, the same SDF representation may be used to render a curve (e.g., a glyph) in similar rendering conditions based on determining that those rendering conditions are similar. Determining that the rendering conditions are similar may involve one or more criteria. For example, it may involve determining that a rotation or movement of the curve and/or viewer/camera is less than a threshold, determining that an amount of scaling of the curve up or down is less than a threshold, determining that there is less than threshold difference in curve size, and/or based on any other assessment of the similarity or difference of the rendering conditions that is associated with whether renderings using the same SDF would have desirable appearance characteristics, e.g., well defined edges, appropriate rounding, sufficiently minimal artifacts, etc.

At block 640, the method 600 involves rendering the second image (e.g., the second frame) depicting the curve in the second rendering condition, where the second image is rendered using the SDF representation.

In some implementations, the method 600 further involves determining to recompute the SDF representation for rendering a third image (e.g., a third frame) depicting the curve in third rendering condition based on a difference of the third rendering condition to the first rendering condition. A second SDF representation representing distances of multiple positions to closest edges of the curve is generated and the third image (e.g., the third frame) depicting the curve in the third rendering condition, is rendered using the second SDF representation. FIG. 4 depicts an example of rendering different views that include depictions of a curve (e.g., a glyph) that are rendered using different SDF representations based on the rendering conditions being different.

The curve depicted in the first image, second image, third image etc. may be depicted within a 2D or 3D environment. In some implementations, rendering a curve is provided in the context of providing a view of a 3D environment. This may involve providing a view of an XR environment, for example, a view that includes a virtual object positioned amongst real and virtual objects. Thus, in some implementations, a curve is depicted in one or more images that provide one or more views of an extended reality (XR) environment. In contrast to a physical environment, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual Objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment. There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, a technique is used to minimize or otherwise reduce lens or other distortion artifacts (e.g., aliasing) that may occur. Some implementations provide a rendering and display pipeline that reduces such artifacts. In one example, during rendering, a scene is sampled and pixel coverage is computed, including some form of anti-aliasing. After rendering, a lens distortion is applied to correct for any physical lens or other distortion in the optical stack, which may include a resampling operation. The SDF representation can optionally be implemented by deferring the calculation of final pixels to a later stage, e.g. after (or during) lens distortion application. That may facilitate the computation of anti-aliasing in the panel/display space, in contrast to during rendering time. In some implementations, this could involve the GPU rendering the SDF representation as described herein, a display pipeline warper consuming the SDF representation and sampling the distance metric, and a lookup function mapping the distances to output values (e.g. color or brightness). The process may involve dynamically computing a lookup function based on a pixel size in display space, view space, etc. The lookup function may convert distance to coverage and, thus, may control how sharp or soft an SDF representation is rendered, e.g., using a smoothstep function width in the range of 0.7-1.5 pixels wide. Width could be dynamical computed, for example, when dealing with a more complex display pipeline.

Figure 7:
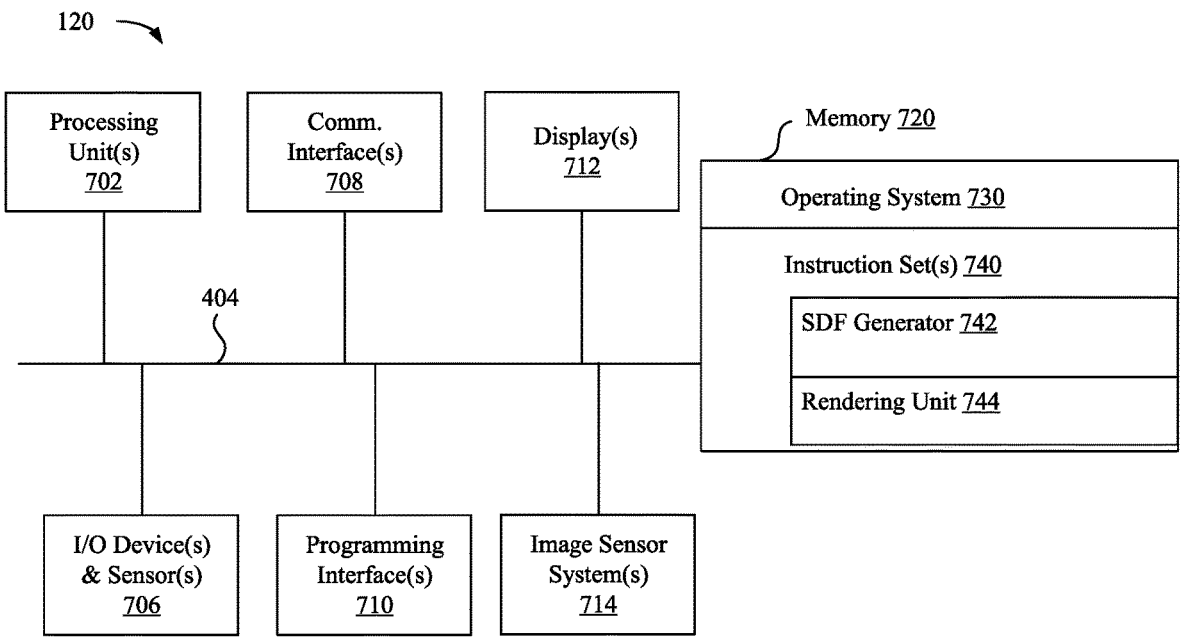
FIG. 7 is a block diagram illustrating exemplary components of a device configured in accordance with some implementations.

FIG. 7 is a block diagram illustrating exemplary components of the device 120 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 702 (e.g., microprocessors, ASICs, FPGAs, GPUs, CPUs, processing cores, and/or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 710, one or more displays 712, one or more interior and/or exterior facing image sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 712 are configured to present a view of a physical environment or a graphical environment (e.g. a 3D environment) to the user. In some implementations, the one or more displays 712 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 712 correspond to diffractive, reflective, polarized, holographic, etc. waveguide displays. In one example, the device 120 includes a single display. In another example, the device 120 includes a display for each eye of the user.

In some implementations, the one or more image sensor systems 714 are configured to obtain image data that corresponds to at least a portion of the physical environment 100. For example, the one or more image sensor systems 714 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more image sensor systems 714 further include illumination sources that emit light, such as a flash. In various implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 includes a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

The instruction set(s) 740 include an SDF generator 742 and a rendering unit 744. The instruction set(s) 740 may be embodied a single software executable or multiple software executables.

In some implementations, the SDF generator 742 is executable by the processing unit(s) 702 (e.g. a GPU) to generate an SDF representation of a curve according to one or more of the techniques disclosed herein. To these ends, in various implementations, it includes instructions and/or logic therefor, and heuristics and metadata therefor.

In some implementations, the rendering unit 744 is executable by the processing unit(s) 702 (e.g., a GPU) to generate and display one or more views that include a curve (e.g., one or more glyphs, text, etc.). The rendering unit 744 may be configures to render the curve as part of a 3D environment, including a 3D environment that includes real or virtual objects. To these ends, in various implementations, it includes instructions and/or logic therefor, and heuristics and metadata therefor.

Although the instruction set(s) 740 are shown as residing on a single device, it should be understood that in other implementations, any combination of the elements may be located in separate computing devices. Moreover, FIG. 7 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first surface could be termed a second surface, and, similarly, a second surface could be termed a first surface, without changing the meaning of the description, so long as all occurrences of the "first surface" are renamed consistently and all occurrences of the "second surface" are renamed consistently. The first surface and the second surface are both surfaces, but they are not the same surface.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device having a processor:
        generating a signed distance field (SDF) representation representing distances of multiple positions to closest edges of a curve, wherein the SDF representation is generated by solving a function based on a mathematical relationship that defines the curve;
        rendering a first image depicting the curve in a first rendering condition, wherein the first image is rendered using the SDF representation;
        determining to reuse the SDF representation for rendering a second image depicting the curve in a second rendering condition based on a similarity of the second rendering condition to the first rendering condition, wherein the first image provides a first view of the curve on a surface within a 3D environment from a first camera viewpoint and the second image provides a second view of the curve on the surface within the 3D environment from a second camera viewpoint, and wherein the similarity of the second rendering condition to the first rendering condition is determined based on a viewpoint difference or curve difference; and
        rendering the second image depicting the curve in the second rendering condition, wherein the second image is rendered using the SDF representation.

2. The method of claim 1 further comprising:
    determining to recompute the SDF representation for rendering a third image depicting the curve in a third rendering condition based on a difference of the third rendering condition to the first rendering condition;
    generating a second SDF representation representing distances of multiple positions to closest edges of the curve; and
    rendering the third image depicting the curve in the third rendering condition, wherein the third image is rendered using the second SDF representation.

3. The method of claim 1, wherein the first image and the second image depict the curve in a three-dimensional (3D) environment based on a defined position of the curve relative to an object in the 3D environment.

4. The method of claim 1, wherein generating the SDF representation comprises:
    segmenting the curve into a grid, wherein each cell of the grid stores zero or more references to nearby Bezier curve portions or line segment portions of the curve; and
    determining the distances of the multiple positions to the closest edges of the curve comprising comparing each position with a subset of portions of the curve based on the grid.

5. The method of claim 1, wherein the SDF representation is generated via a graphics processing unit (GPU) and stored in a GPU cache.

6. The method of claim 1, wherein the curve forms at least a portion of glyph.

7. The method of claim 1, wherein the curve comprises a Bezier curve, a line, or a circle segment.

8. The method of claim 1, wherein the SDF representation is stored as a two-dimensional texture.

9. The method of claim 1, wherein solving the function comprises solving a cubic polynomial.

10. The method of claim 1, wherein the SDF representation is generated without applying a Euclidian transformation.

11. The method of claim 1, wherein the similarity of the second rendering condition to the first rendering condition is determined based on a rotation of the curve or a camera position.

12. The method of claim 1, wherein the similarity of the second rendering condition to the first rendering condition is determined based on an amount of scaling of the curve up or down between the first condition and the second condition.

13. The method of claim 1, wherein the similarity of the second rendering condition to the first rendering condition is determined based on a difference in a size of the curve.

14. The method of claim 1 further comprising:
sampling distances of the SDF representation; and
mapping the distances to color or brightness output values.

15. The method of claim 14, wherein a lookup function is dynamically computed based on a pixel size.

16. The method of claim 1, wherein the similarity of the second rendering condition to the first condition is determined based on determining that a 3D position of the first camera viewpoint in the 3D environment differs from a 3D position of the second camera viewpoint in the 3D environment by less than a threshold amount.

17. The method of claim 1, wherein the similarity of the second rendering condition to the first condition is determined based on determining that a rotation of a 3D position of the curve from the first view to the second view is less than a threshold amount.

18. The method of claim 1, wherein the similarity of the second rendering condition to the first condition is determined based on determining that an amount of scaling of the curve up or down from the first view to the second view is less than a threshold amount.

19. The method of claim 1, wherein the similarity of the second rendering condition to the first condition is determined based on determining that a difference in a size of the curve from the first view to the second view is less than a threshold amount.

20. A system comprising:
a device with one or more graphics processing units (GPUs); and
a memory including instructions that, when executed by the one or more GPUs, cause the system to perform operations comprising:
generating a signed distance field (SDF) representation representing distances of multiple positions to closest edges of a curve, wherein the SDF representation is generated by solving a function based on a mathematical relationship that defines the curve;
rendering a first image depicting the curve in a first rendering condition, wherein the first image is rendered using the SDF representation;
determining to reuse the SDF representation for rendering a second image depicting the curve in a second rendering condition based on a similarity of the second rendering condition to the first rendering condition, wherein the first image provides a first view of the curve on a surface within a 3D environment from a first camera viewpoint and the second image provides a second view of the curve on the surface within the 3D environment from a second camera viewpoint, and wherein the similarity of the second rendering condition to the first rendering condition is determined based on a viewpoint difference or curve difference; and
rendering the second image depicting the curve in the second rendering condition, wherein the second image is rendered using the SDF representation.

21. The system of claim 20, wherein the operations further comprise:
determining to recompute the SDF representation for rendering a third image depicting the curve in third rendering condition based on a difference of the third rendering condition to the first rendering condition;
generating a second SDF representation representing distances of multiple positions to closest edges of the curve; and
rendering the third image depicting the curve in the third rendering condition, wherein the third image is rendered using the second SDF representation.

22. The system of claim 20, wherein the first image and the second image depict the curve in a three-dimensional (3D) environment based on a defined position of the curve relative to an object in the 3D environment.

23. The system of claim 20, wherein generating the SDF representation comprises:
segmenting the curve into a grid, wherein each cell of the grid stores zero or more references to nearby Bezier curve portions or line segment portions of the curve; and
determining the distances of the multiple positions to the closest edges of the curve comprising comparing each position with a subset of portions of the curve based on the grid.

24. A non-transitory computer-readable medium storing program instructions executable via one or more graphics processing units (GPUs) to perform operations comprising:
generating a signed distance field (SDF) representation representing distances of multiple positions to closest edges of a curve, wherein the SDF representation is generated by solving a function based on a mathematical relationship that defines the curve;
rendering a first image depicting the curve in a first rendering condition, wherein the first image is rendered using the SDF representation;
determining to reuse the SDF representation for rendering a second image depicting the curve in a second rendering condition based on a similarity of the second rendering condition to the first rendering condition, wherein the first image provides a first view of the curve on a surface within a 3D environment from a first camera viewpoint and the second image provides a second view of the curve on the surface within the 3D environment from a second camera viewpoint, and wherein the similarity of the second rendering condition to the first rendering condition is determined based on a viewpoint difference or curve difference; and
rendering the second image depicting the curve in the second rendering condition, wherein the second image is rendered using the SDF representation.

* * * * *